Dec. 11, 1951     C. H. REX     2,578,451
LUMINAIRE Filed Aug. 30, 1946     6 Sheets-Sheet 1

Inventor:
Charles H. Rex,
by *Charles H. Mitt.*
His Attorney.

Dec. 11, 1951     C. H. REX     2,578,451
LUMINAIRE

Filed Aug. 30, 1946     6 Sheets-Sheet 2

Inventor:
Charles H. Rex,
by *Claude H. Mott.*
His Attorney.

Dec. 11, 1951   C. H. REX   2,578,451
LUMINAIRE
Filed Aug. 30, 1946   6 Sheets-Sheet 3

Inventor:
Charles H. Rex,
by *Charles H. Mott*
His Attorney.

Dec. 11, 1951  C. H. REX  2,578,451
LUMINAIRE
Filed Aug. 30, 1946  6 Sheets-Sheet 4

Inventor:
Charles H. Rex,
by His Attorney.

Dec. 11, 1951       C. H. REX       2,578,451
LUMINAIRE
Filed Aug. 30, 1946       6 Sheets-Sheet 5

Inventor:
Charles H. Rex,
by *Claude H. Nott.*
His Attorney.

Patented Dec. 11, 1951

2,578,451

UNITED STATES PATENT OFFICE 2,578,451

LUMINAIRE

Charles H. Rex, Marblehead, Mass., assignor to General Electric Company, a corporation of New York Application August 30, 1946, Serial No. 694,012

18 Claims. (Cl. 240—25)

My invention relates to luminaires, and more particularly to street or roadway luminaires and reflectors.

Heretofore it has been common to use luminaires of the open reflector type for residential and suburban street lighting and highway illumination. Many such reflectors have been objectionable because they permit the propagation of direct light rays at high angles transversely of the roadway. This light is not only lost for use on the roadway itself, but is objectionable in homes along the roadway.

For maximum driver visibility the roadway should be illuminated to a relatively high intensity and in a substantially rectangular pattern extending along the roadway in both directions from the luminaire. This rectangular pattern should be sufficiently wide to include the sidewalk and yard areas on both sides of the roadway, but the cut-off angle transverse of the roadway should be sufficiently low so that no direct light falls upon the second-floor windows of homes, adjacent the roadway and set back a typical distance from the roadway. Preferably the cut-off of direct light is below the first-floor level of such homes, so that only a slight amount of diffused light is permitted beyond the desired roadside area.

Where luminaires are mounted at one side of a roadway, it is desirable that the amount of reflected light directed upon the remote side of the roadway be appreciably greater than that directed upon the adjacent side. The reason for this is that objects upon the roadway are discerned from a distance mainly by silhouetting against the light reflected from the roadway surface. Since the light reflected from the roadway surface upon the remote side of the roadway is directed more obliquely to a driver's line of vision along the roadway than is the light reflected from the adjacent side of the roadway, it is necessary that a greater amount of reflected light fall on the remote side in order to give a comparable silhouetting effect.

Accordingly, therefore, it is a general object of my invention to provide a new and improved street or roadway lighting luminaire.

It is a further object of my invention to provide a reflector for street-lighting luminaires shaped to distribute the light mainly in a substantially rectangular pattern along the roadway without necessarily involving multiple reflection of light.

It is still another object of my invention to provide a new and improved reflector shaped to confine direct or unreflected light to a substantially rectangular pattern along the roadway.

It is another object of my invention to provide an open ovate reflector shaped to give a desired roadway illumination pattern without multiple reflection of light.

Still another object of my invention is to provide, in conjunction with a main roadway lighting reflector, depending auxiliary reflecting means shaped to provide a rectangular cut-off pattern on the roadway, the auxiliary reflecting means being of ovate horizontal cross section to direct light reflected therefrom mainly up and down the roadway within said rectangular pattern.

It is a more particular object of my invention to provide, in conjunction with an ovate main reflector arranged to direct light by single reflection mainly up and down a roadway in asymmetric beams, depending auxiliary reflecting means of substantially ovate horizontal cross section having a lower edge shaped to provide a substantially rectangular cut-off pattern on the roadway, the auxiliary reflecting means intercepting only direct light from the source and redirecting such light along said main beams.

A still further object of my invention is to provide a new and improved open ovate roadway reflector having side portions shaped to direct a maximum amount of light at high angles and mainly obliquely along the roadway in opposite directions.

For a better understanding of my invention and a further appreciation of the objects and advantages thereof reference may now be had to the following detailed specification, taken in conjunction with the accompanying drawings, in which.

Figure 1:
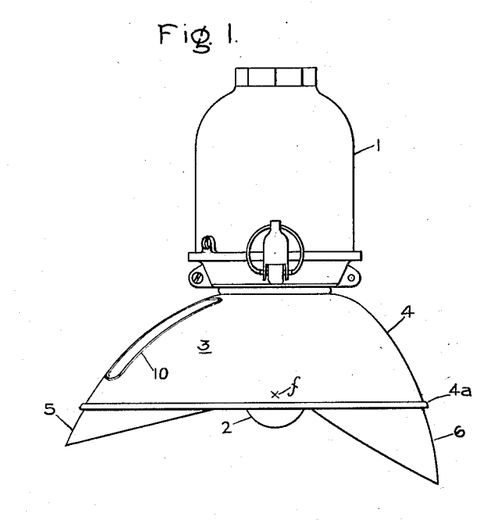
Figs. 1 and 2 are side and front views respectively of a luminaire embodying my invention.

Referring now to the drawings, the luminaire shown at Fig. 1 comprises a mounting hood 1 having mounted therein a socket for a light source, such as an incandescent filament lamp 2, and arranged removably to support a reflector 3. The reflector 3 comprises a main upper portion 4 of generally ovate inverted bowl shape having a rim 4a perpendicular to its major plane of symmetry, and a pair of auxiliary reflectors 5 and 6 mounted upon the main reflector and depending below the rim. The auxiliary reflectors 5 and 6 are located at opposite ends of the ovate main reflector 4 and are tapered upwardly and inwardly toward the center portion of the rim of the main reflector. The incandescent lamp 2 is so mounted that its light center is eccentrically located upon the major axis of the reflector and above the plane of the reflector rim, 4a, as at the point f in Fig. 1. The distance of the light source above the reflector rim is determined by the dimensions of the reflector and the desired vertical angles of cut-off of direct illumination along and across the roadway. Preferably this angle of cut-off by the main reflector alone is between seventy-five and eighty-five degrees above the vertical to the nadir.

The auxiliary reflectors 5 and 6 may be mounted upon the main reflector 4 in any desired manner, either permanently or removably, or in fact may be formed in one piece with the main reflector. These auxiliary reflectors have the general configuration of visors, the rear visor extending lower than the front visor so that the cut-off of direct illumination on the house side of the luminaire is lower than on the street side. Preferably the luminaire is mounted at one side of the roadway and the visors 5 and 6 arranged so that the cut-off angle on the house side (visor 6) is about 60 degrees above the vertical to the nadir, and on the street side (visor 5) about 75 degrees above the vertical. The auxiliary reflectors 5 and 6 at Fig. 1 are shown permanently attached to the main reflector 4, as by welding. At Fig. 4 the auxiliary reflectors are shown removably attached, as by a pair of interfitting lugs 7 at each side and a clamp 8 at each end engaging the rolled rim of the main reflector.

Figure 3:
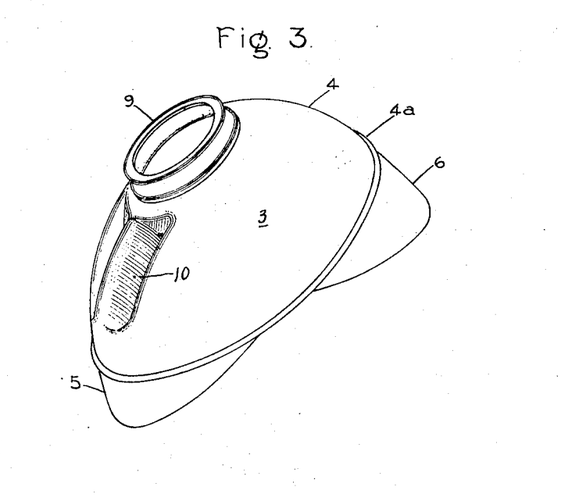
Fig. 3 is a perspective view of the main and auxiliary reflectors forming part of the luminaire of Figs. 1 and 2.
Figures 4, 6:
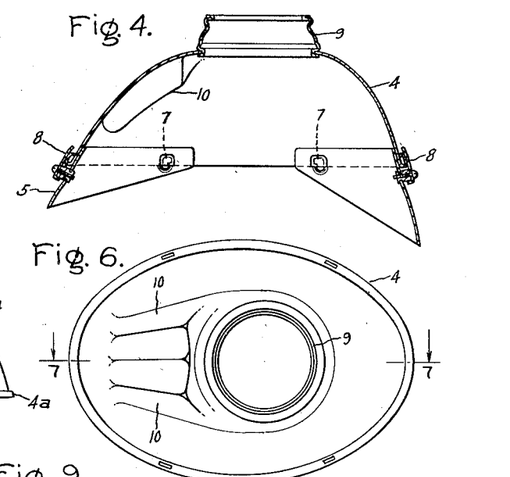
Fig. 4 is a cross-sectional view in the plane of symmetry of the reflector shown at Fig. 3.
Fig. 6 is a top view of the reflector shown at Fig. 5.
Figures 5, 9A, 9B:
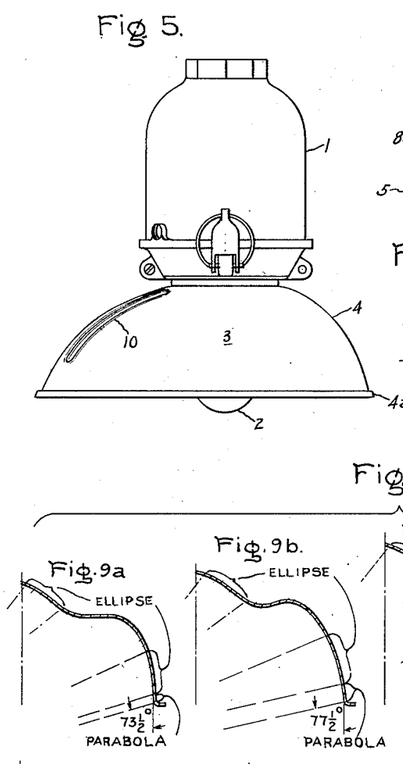
Fig. 5 is a side view of a luminaire embodying my invention in modified form.

At Figs. 3 and 4 I have shown perspective and vertical cross-sectional views respectively of the reflector shown on the luminaire at Fig. 1. From Figs. 3 and 4 it will be evident that the main reflector 4 is provided with a circular aperture in its upper surface into which is rolled a circular mounting collar 9. Preferably the mounting collar 9 is of standard size and arranged to fit existing mounting hoods.

It is also evident, particularly from Figs. 3 and 4, that in the upper zone of the main reflector 4 on the front end, i. e. the street side of the luminaire, the reflector is provided with two elongated indentations 10 symmetrically located and slightly angularly disposed with respect to the major axis of the reflector. The purpose of these indentations will be more fully explained hereinafter in conjunction with the following detailed description of the configuration of the reflector.

Figure 7:
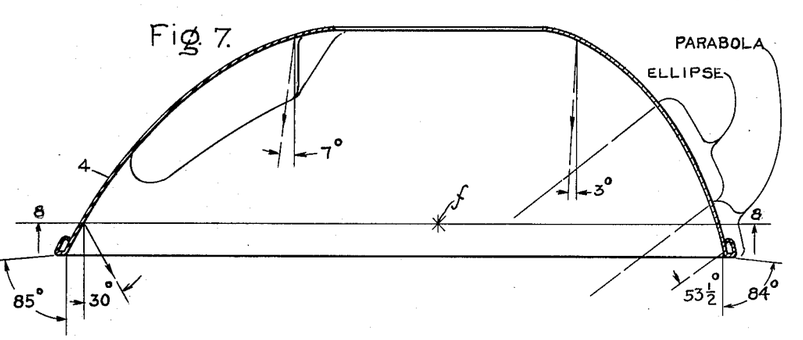
Fig. 7 is a vertical cross-sectional view in the plane of symmetry of the reflector shown at Fig. 5.
Figure 8:
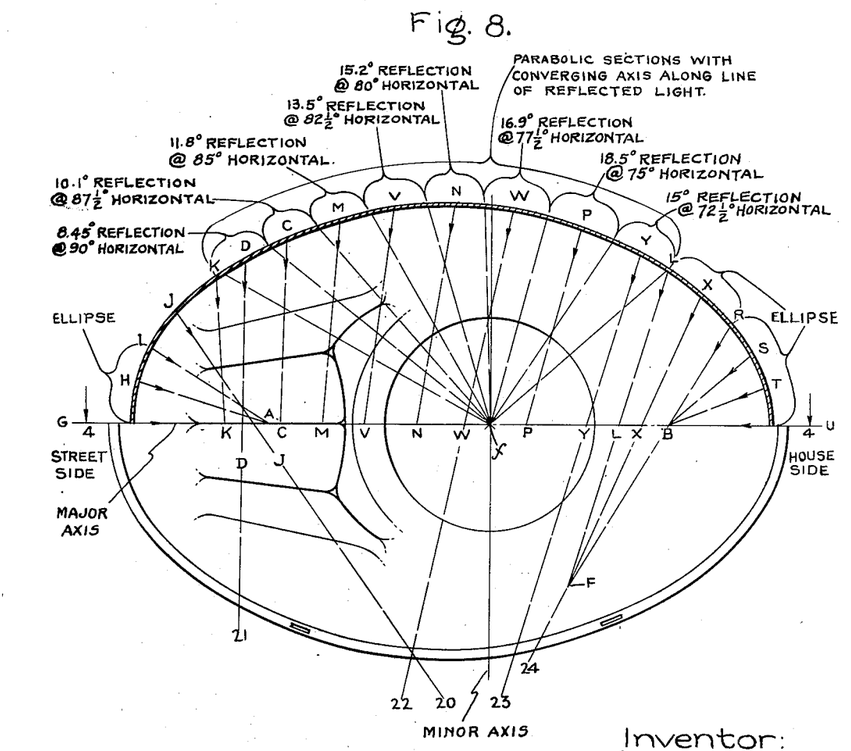
Fig. 8 is a bottom view of the reflector shown at Fig. 5, showing on one side of the plane of symmetry a horizontal cross-sectional view taken in a plane including the light source, as indicated by the line 8—8 of Fig. 7.

The details of configuration of my reflector will be readily understood by referring first to Fig. 8. Fig. 8 is a bottom view of the main reflector, but with that portion of the reflector on one side of the plane of symmetry shown in cross section. The cross section is taken in a horizontal plane through the light source and thus slightly above but parallel to the plane of the rim of the reflector. As shown at Fig. 8, the light source, such as an incandescent lamp filament located at the point f, is eccentrically positioned along the major axis GU and in the plane of symmetry of the reflector. As indicated at Figs. 1 and 7, the light source is also positioned above the plane of the rim of the reflector. For the purpose of simplifying the following description it will be assumed that the reflector rim is in a substantially horizontal plane parallel to the plane of the roadway, as the reflector is normally mounted. It will of course be understood that if desired the reflector may be mounted with the plane of its rim slightly oblique to the roadway. Thus, in the appended claims, where the words "horizontal" and "vertical" are used in defining planes through the reflector they are to be understood as specifying only parallelism and perpendicularity, respectively, with the plane of the reflector rim.

In general, the ovate inverted bowl-shaped main reflector 4 comprises like side portions on opposite sides of the plane of symmetry arranged to direct reflected light manly obliquely along the roadway, and a pair of end portions at opposite ends of the major axis of the reflector arranged generally to direct light downwardly and obliquely across the roadway. The side portions intercept only light directly from the source and redirect such light into a pair of main laterally directed asymmetric beams cast obliquely along the roadway in opposite directions. For narrow roadways these main beams ordinarily cover only a relatively small horizontal angle, for example about 15 to 20 degrees. To build up the illumination and properly distribute the light within these beams, however, the side portions are so shaped that they intercept light from the source throughout a horizontal angle considerably wider than the beam angle. Indeed, the side portions of the reflector may be arranged to intercept light from the source through more than a full quadrant, for example, throughout a horizontal angle of about 110 degrees, so that the greater part of the total light from the source is redirected by the reflector side portions into the relatively narrow main asymmetric beams.

Referring more specifically to Fig. 8, the side portion of that half of the reflector shown in cross section is that portion included between the region of a section KK and the region of a section LL. The horizontal cross-sectional configuration of the reflector in this side region is a composite curve comprising a plurality of adjacent parabolic sections having their foci at the light source and having axes passing through the light source and parallel to the broken lines KK, DD, CC, MM, VV, NN, WW, PP, YY, and LL. These broken lines represent the horizontal projections of light rays reflected from the various parabolic sections in a horizontal plane through the light source. As may be observed, the reflected rays are all generally in the same direction but slightly converging, and are directed obliquely along the roadway at a small angle to the direction of the roadway, i. e. the minor axis of the reflector. The width of each parabolic section is so chosen that it intercepts a desired amount of direct illumination from the source for redirection in the direction of its particular parabolic axis into the roadway zone involved. For example, it will be noted from Fig. 8 that the horizontal projections of the parabolic axes of the various elements of the side portion generally increase in inclination to the direction of the roadway from the front of the reflector toward the back. Thus, the rear elements of the side portion, in the region of the sections NN, WW, PP, YY, and LL tend to direct light falling thereon to the remote side of the roadway, whereas the forward elements of the side portion, in the region of the sections KK, DD, CC, and MM tend to throw light directed therefrom upon the adjacent side of the roadway. Since, as previously pointed out, it is desirable to provide a greater intensity of illumination on the remote side of the roadway than upon the adjacent side, the cross section shown at Fig. 8 is so arranged that the parabolic elements of the horizontal cross section in the front part of the reflector intercept a smaller angle of light flux than those in the rear part. This is indicated by the brackets along the side section of the reflector Fig. 8 in conjunction with the indication of degrees of radiation intercepted from the source. It will be observed that by utilizing the major part of the side portion to direct light to the remote side of the roadway a greater intensity of illumination will be attained upon the remote side of the roadway than upon the adjacent side.

The end portions of the reflector are generally elliptical in horizontal cross section, thereby to direct light generally obliquely across the roadway in a distributed pattern, as distinguished from the side portions which direct light generally obliquely along the roadway. Specifically, the horizontal cross-sectional configuration of the reflector in the region of the sections BS, BT, and BU is elliptical, with the foci at the light source and at B. The horizontal cross-sectional configuration of the reflector in the region of the sections LL, XX, and RB is also elliptical with foci at the light source and at F. This elliptical section with one focus at F is thus a transition section between the rear end section and the side section and is arranged to direct a desired amount of light to the remote portion of the roadway pattern adjacent to the front side of the associated main beam.

Referring now to the front end portion of the reflector, the horizontal cross-sectional configuration in the region of the sections IA, HA, and GA is elliptical with foci at the light source and at A. As at the rear end of the reflector the cross-sectional configuration of the front end in the region of the section JJ is a suitable connecting curve between the elliptical front end portion and the parabolic side portion, arranged to direct a disired amount of light to the remote portion of the roadway pattern adjacent the rear side of the associated main beam.

As previously stated the broken lines HA to BT inclusive represent the horizontal projections on a plane through the light source of light rays reflected from various points of the reflector in that plane. It is well known to those skilled in the art that light impinging upon a parabolic reflector from the focus of the parabola is redirected parallel to the parabolic axis, while light directed upon an elliptical reflector from one of the foci is redirected through the other focus. It should be noted that, due to convergence of the reflector surface at the top of the reflector, light impinging upon any section in a vertical plane through one of the reflected rays indicated at Fig. 8 but on a higher horizontal level, might be reflected at a slightly different horizontal angle from that shown. Such divergence, however, is not necessarily large, so that for all practical purposes vertical planes taken through the broken lines of Fig. 8 may be said to include reflected light rays, or the horizontal projection of reflected light rays, from the intercepted vertical section of the reflector.

Referring now to the configuration of the main reflector 4 in vertical cross section, reference may be had to the various diagrams of Fig. 9 taken in conjunction with Fig. 8. At Fig. 9 I have shown a number of vertical cross-sectional views perpendicular to the plane of the rim of the reflector and lying along the directions of reflected light from that point of the reflector where the section is taken; that is, the various views of Fig. 9 are taken along the various sections indicated in broken lines at Fig. 8. In general, the vertical cross sections of the side portions of the reflector in planes including light reflected from the sections are so shaped that light reflected from each section will be redirected at the highest desirable angle without impinging upon the lower edge of the reflector at the opposite side of the major axis.

Referring to Fig. 9, it will be observed that the vertical cross section of each side portion of the reflector 4 in planes including the horizontal projection of reflected light from the sections is a composite curve including a parabolic portion and an adjacent elliptical portion. The parabolic portions are all in a lower zone of the reflector adjacent the reflector rim and extend upwardly the maximum distance permitted by the reflector geometry while allowing all light reflected from the parabolic portion to pass below the reflector rim on the opposite side of the reflector. In the various diagrams in Fig. 9 the approximate extent of the parabolic and elliptical portions in vertical cross section are indicated by brackets adjacent the various diagrams. It will be observed that the lengths of the parabolic portions vary to some extent, but that in general the reflector, and particularly each side portion thereof is of parabolic vertical cross section in a lower zone adjacent the reflector rim, while it is of elliptical vertical cross section in the upper zone of the reflector.

The reflector configuration described above will be more evident from an examination of Fig. 9, wherein diagram 9a is a cross-sectional view of one half of the main reflector 4 in a plane perpendicular to the plane of the reflector rim and including the line KK at Fig. 8. Figs. 9b, 9c, 9d, 9e, 9f, 9g, 9h, 9i, and 9j are similar cross-sectional views in planes including the lines DD, CC, MM, VV, NN, WW, PP, YY, and XX, respectively at Fig. 8. On each of these vertical sectional views the broken line from the reflector rim indicates the direction of the parabolic axis of the parabolic portion of the section. The inclination of these parabolic axes with respect to the vertical to the nadir is indicated in degrees in connection with each diagram of Fig. 9. It will be observed from these diagrams that, in general, the vertical parabolic axes for the side portions of the reflector between the sections KK and LL, Fig. 8, are at about 77½ degrees to the vertical. There is, of course, nothing critical about this particular angle. The angle is determined principally by the desired vertical extent of the parabolic portion of the vertical sections and by the reflector width along the minor axis. The example serves to illustrate, however, that the large side portion of the reflector between KK and LL is preferably designed to throw an intense directional beam of light at a high angle obliquely along the roadway. It is evident that the other half of the reflector will throw a similar high intensity beam at a high angle obliquely along the roadway in the opposite direction.

The end sections of the main reflector between the section KK and the section GU, Fig. 8, on the front side and between the section XX and the section GU, Fig. 8, on the rear side are shaped to direct reflected light mainly obliquely across the roadway. For this purpose, the configuration of these sections in vertical planes including the horizontal projections of light reflected from these sections are, in general, composite curves including parabolic portions in the lower zone and elliptical portions in the upper zone. It will be noted that the inclination of the vertical parabolic axes to the vertical decreases gradually around the end sections as the parabolic axes approach parallelism with the major axis. Thus the direction of light reflection at the section AH is 31 degrees from the vertical to the nadir, and the direction of light reflection at the section BT is 55 degrees from the vertical. From Fig. 7 it will be observed that in the zone of the rim the vertical cross sections along the major axis reflect light at 30 degrees from the vertical at the front end of the reflector and at 53½ degrees from the vertical at the rear end of the reflector.

Figures 9C, 9D:
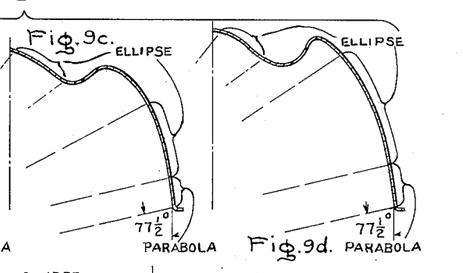
Fig. 9 shows a plurality of vertical cross-sectional views through one half of a reflector embodying my invention and taken along lines indicated on Fig. 8.
Figure 9E:
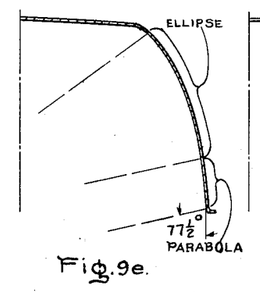
Figure 9F:
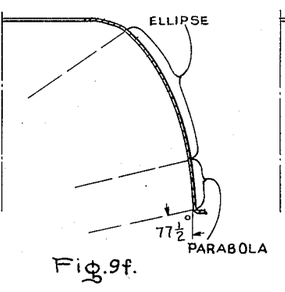
Figure 9G:
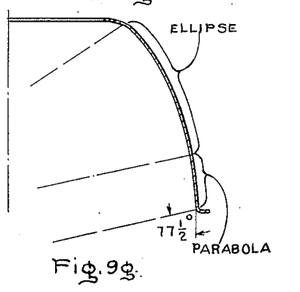
Figure 9H:
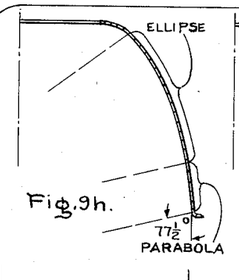
Figure 9I:
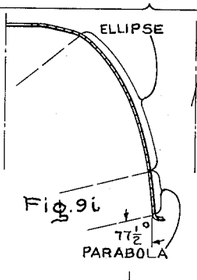
Figures 9J, 9K:
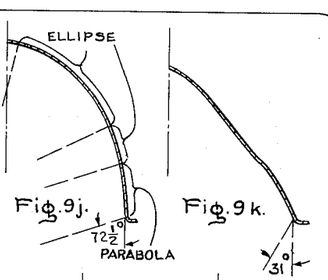
Figure 9L:
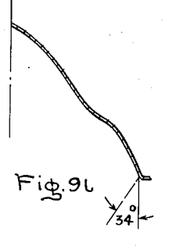
Figures 9M, 9N, 9O:
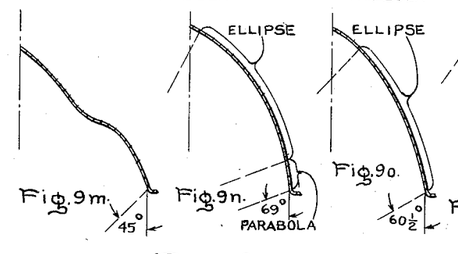
Figure 9P:
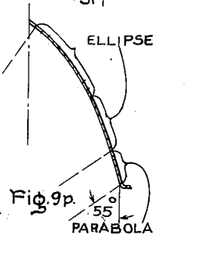

The vertical cross-sectional configuration of the reflector in planes perpendicular to the plane of the rim and including the light projections HA, IA, and JJ are shown in Figs. 9k, 9l, and 9m, respectively. Similar cross-sectional views for the rear end portion of the reflector at the sections BR, BS, and BT are shown at Figs. 9n, 9o, and 9p, respectively. The front and rear cross-sectional configuration in the plane of the major axis is shown at Fig. 7. From these drawings it will be observed that the vertical cross-sectional configuration of the end sections is either entirely elliptical, entirely parabolic, or a composite elliptical and parabolic curve, depending upon the direction in which it is desired to project the reflected light. Moreover, the front end sections, 9k, 9l, and 9m, are not clearly either parabolic or elliptical but represent the vertical curvature of suitable connecting surfaces between the other portions of the reflector.

Figures 10, 10D, 10E:
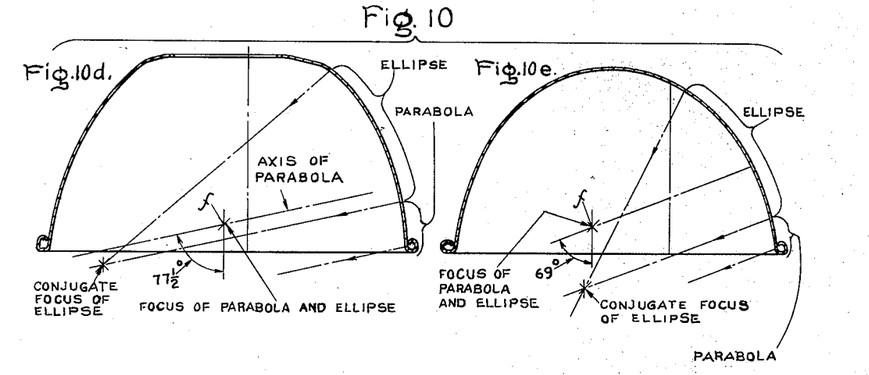
Fig. 10 shows additional vertical cross-sectional views of the reflector taken along other lines indicated in Fig. 8.
Figure 10A:
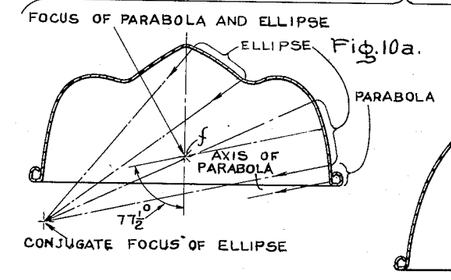
Figure 10B:
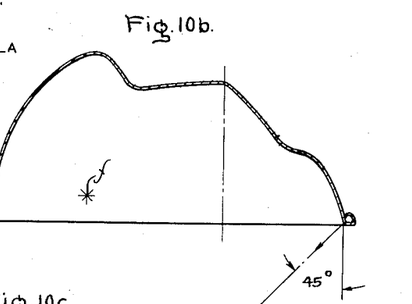

At Fig. 10, a, b, c, d and e, I have shown vertical cross-sectional views of the entire main reflector 4 along the lines 21—DD, 20—JJ, 22—WW, 23—YY, and 24—BR, respectively, of Fig. 8. On the diagrams at Fig. 10, I have indicated the location of the light source at f and the location of the parabolic and elliptic foci, along with the direction of the parabolic axis in each case. It will be evident from inspection of these diagrams that the parabolic axes are so inclined that all light reflected from the parabolic portion is directed below the rim of the reflector upon the opposite side of the major axis, and that the conjugate foci of the elliptical portions are so positioned that double reflection of light is avoided and light is directed into a desired portion of the road pattern. In general, the conjugate foci of the elliptical part of the vertical sections in the side portions of the reflector are positioned so that light is directed at high angles along the road, and the conjugate focus for elliptical part of the vertical sections at the end portions of the reflector are positioned so that light is directed more nearly downwardly into that portion of the roadway pattern closer to the reflector itself.

Attention is directed to the two slightly angularly disposed but generally longitudinal indentations 10 on opposite sides of the major axis in the end portion on the front or street side of the reflector 4. It will be evident from Figs. 9b, 9c, 9d, and 10a that the effect of these indentations is to offset inwardly the upper end of each elliptical curve forming the vertical cross section of the reflector in this region. This offset reflector surface provided by the indents reflects light out on the roadway at more favorable vertical and horizontal angles than would result from flat or peaked surfaces between the parabolic and elliptical lower portions of the sections KK, DD, CC, and MM. For example, if the surface were made peaked by carrying the ellipse up in a continuous curve without offsetting, the reflected light from the upper portion would be directed downwardly at only a small angle to the nadir, and light would be reflected back to the house side at a relatively high angle. On the other hand, if the maximum depth of the reflector at the front end is limited by appearance and design, the necessary shape of the side portions in the lower region of the sections KK, DD, CC, and MM, Fig. 8, would necessitate a substantially flat dome. Such a flat dome would concentrate light directly beneath the luminaire. Therefore, in order to project light reflected from the upper front region out on to the roadway and at high angles along the main asymmetric beams, the indentations provide offset sloping elliptical surfaces immediately adjacent opposite sides of the plane of symmetry.

Referring now more particularly to the auxiliary reflectors or visors 5 and 6 shown at Figs. 1, 2, 3, and 4, it was previously noted that these visors are tapered upwardly toward the reflector rim from their lowest points at opposite ends of the major axis. The lower edges of these visors are so shaped that the cut-off of direct illumination forms upon the roadway a substantially rectangular pattern. It will be understood that in horizontal cross section the visors 5 and 6 follow generally the U-shaped configuration of the ends of the reflector rim shown at Fig. 8. In vertical cross section, the visors are so shaped that they form in effect a continuation of the main reflector 4. Generally, the vertical cross section of the visors is continuously arcuate. More specifically the vertical cross section is parabolic in planes perpendicular to the plane of the rim of the main reflector and including light rays reflected from the visors, the side portions of the visors being shaped particularly to project reflected light at high angles along the main asymmetric beams directed obliquely along the roadway by the side portions of the main reflector. Furthermore, both the side and end portions of the visors are so shaped that all light reflected therefrom is directed out of the reflector to the roadway, and not against any other portion of the reflector surface for multiple reflection. It will be understood, of course, from the foregoing description of the configuration of the main reflector 4 that the visors receive only light directly from the source and do not intercept any reflected light.

Figure 11:
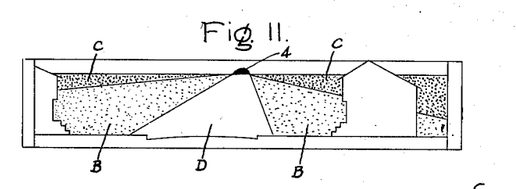
Figs. 11 to 18 inclusive are light distribution diagrams illustrating the operation of luminaires and reflectors embodying my invention.

At Figures 11 to 18, inclusive, is a series of diagrams showing the light distribution when a luminaire according to my invention is mounted at one side of a roadway with its rim in a horizontal plane. For the purpose of illustration, it is assumed that the mounting height of the luminaire is 20 feet above the pavement and that the luminaire overhangs the curb or edge of the roadway by about 4 feet with the reflector major axis transverse to the roadway. With such an arrangement, Fig. 11 shows the cut-off of light in a perpendicular plane transverse to the direction of the roadway for a luminaire including the main reflector 4 only and without the visors 5 and 6. At Fig. 11, the light source is shielded from view in the zone C by reason of the fact that the light source is positioned above the rim of the reflector. The zone C therefore receives light only by diffuse reflection from the opposite lower inside surface of the reflector. In the zone B, the principal illumination is received from the light source directly, with perhaps the addition of a small amount of diffusely reflected light if the reflector surface is not entirely spectral. In the zone D is concentrated the principal reflected light from the reflector 4. The zone D, of course, also receives light directly from the light source.

Figure 12:
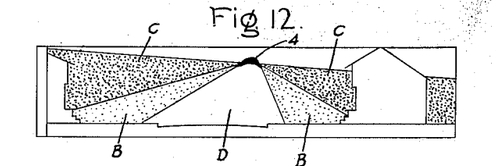

At Fig. 12, I have shown a diagram similar to that of Fig. 11, but drawn for a luminaire comprising the main reflector 4 and the visors 5 and 6 of Fig. 1. At Fig. 12, the zones B, C, and D correspond to the similarly identified zones of Fig. 11, but it will be noted that the cut-off of direct illumination, that is, the line between the zones B and C, is lower at Fig. 12 because of the inclusion of the visors 5 and 6. Thus, Fig. 12 illustrates particularly the improved roadside shielding obtainable by use of the visors 5 and 6.

Figure 13:
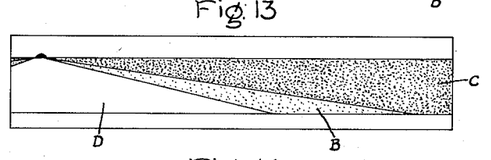

At Fig. 13, I have shown the cut-off pattern in a vertical plane along the roadway. In this figure, the indicated zones, B, C, and D, correspond to the similarly identified zones in Figs. 11 and 12. Thus, at Fig. 13, the line between the zones B and C indicates the cut-off angle for direct illumination along the roadway, that is, as viewed by a driver approaching the luminaire. For the conditions assumed the zone B extends approximately 140 feet along the roadway from the luminaire position as indicated at Fig. 13, but at the height of the average driver's eyes above the roadway direct shielding is effective to within a distance of about 110 feet from the luminaire.

Figure 14:
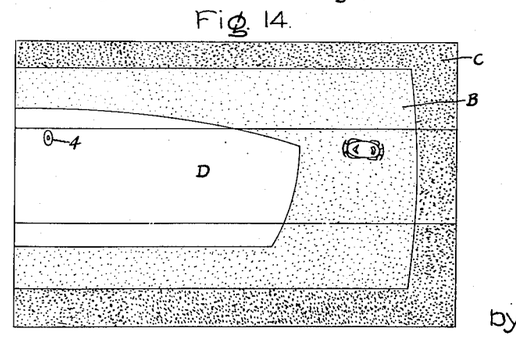

At Fig. 14, I have shown a plan view of the roadway looking down upon a reflector 4 and illustrating the light distribution on the road surface in the zones B, C, and D of Figs. 11 to 13. It will be noted particularly from Fig. 14 that direct illumination from the light source in the zones B and D is confined to a substantially rectangular pattern on the roadway as indicated by the line between the zones B and C.

Figure 15:
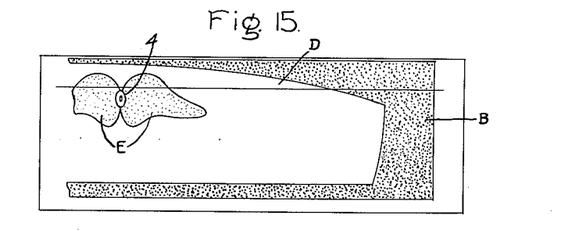

Fig. 15 is another plan view similar to Fig. 14, but showing in greater detail the light distribution within the zone D. The diagram Fig. 15 is drawn for a luminaire including either the main reflector 4 only or with a main reflector 4 with visors 5 and 6. As previously stated, reflected light is confined to the zone D. Fig. 15, however, further illustrates that within the zone D there is on each side of the reflector a small zone E immediately adjacent the reflector which receives little or no reflected light, but principally light directly from the source. The intensity of direct source illumination in zone E is ordinarily sufficient without the addition of reflected illumination, so that the reflected light is utilized to increase the intensity upon the road surface in the more remote portions of the zone D.

Figure 16:
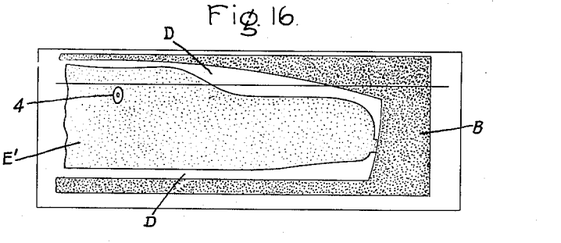

Fig. 16 is a diagram similar to that of Fig. 15 except that Fig. 16 is drawn for the visors only. That is, Fig. 16 illustrates that reflected light from the visors is confined to the zone D of Fig. 15, i. e., confined to the pattern established for the reflected light from the main reflector. Zone D in Fig. 16 shows that this reflected light from the visors may be used to build up the illumination in the outer edges of the reflected light pattern. Thus, if the visors were mounted in normal position beneath a light source without any main reflector, a zone E' of Fig. 16 would receive only direct illumination from the source, but the visors would serve a useful purpose in building up illumination in the manner shown. It will, of course, be understood that by shaping the visors slightly differentially the pattern of light reflected from the visors may be redistributed within the rectangular roadway pattern.

Figure 17:
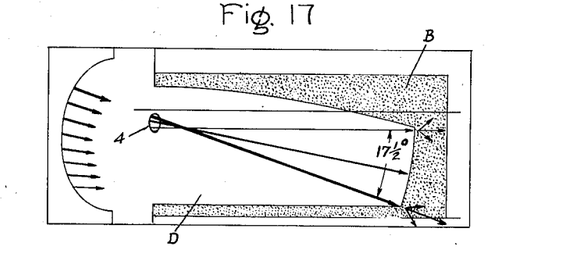

Fif. 17 is a diagram similar to that of Fig. 15 but drawn more particularly to show the direction in plan view of the main reflected asymmetric beam from the side portions of the main reflector 4. The directional arrows at Fig. 17 indicate generally by their thickness the proportion of light intensity directed into the various portions of the zone D by the main side portions of the reflector on the opposite side of the luminaire. Fig. 17 shows, then, that the main reflected beam cast into the zone D is thrown obliquely along the roadway, so that the greatest light intensity is provided on the side of the roadway remote from the reflector. At the left side of Fig. 17, there is shown an enlarged horizontal cross-sectional view of the main reflector 4 to show the source of the light distribution comprising the main reflected beam.

Figure 18:
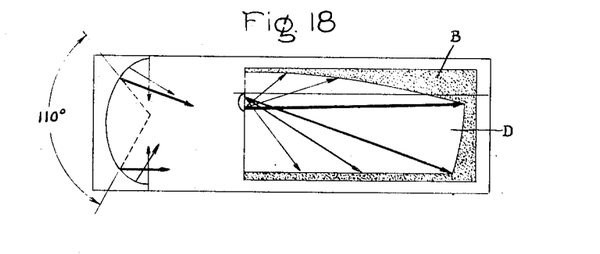

At Fig. 18, I have shown a light distribution diagram in plan view similar to that of Fig. 17, but drawn more particularly to show the distribution of light from the front and rear end portions of the reflector as distinguished from the side portions. Reflected light from the end portions is directed to the sides of the roadway pattern, as shown, and its amount and direction are so chosen that light is distributed along the sides of the pattern where most needed for well balanced illumination. The 110 degree angle indicated in broken lines at Fig. 18 embraces the reflector side portions described more particularly hereinbefore.

The foregoing description of the light distribution by a reflector embodying my invention has been based upon the assumption that the reflecting surface is specular in nature. It is possible, without disturbing greatly the general plan of light distribution, to etch the inner surface of the reflector lightly and thereby to reduce the maximum candlepower and provide some additional diffused light. It will be appreciated that a certain amount of diffusely reflected light in the zone C of Figs. 11 to 14 may be desirable.

While I have described and illustrated various embodiments of my invention in which the main reflector is symmetrical on opposite sides of the major plane, I wish to have it understood that, without departing from the scope of the invention, the reflector may, if desired, be so shaped that the main lateral beams directed along the roadway in opposite directions are at different angles with respect to the roadway centerline.

Figure 2:
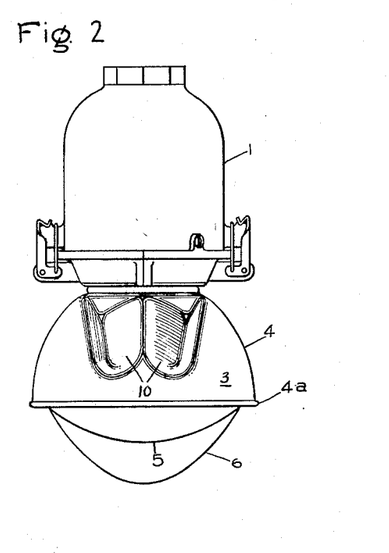

Finally, it is desired to direct attention to the fact that the auxiliary reflectors or visors 5 and 6 shown at Figs. 1, 2, and 3 need not necessarily be used with a main reflector 4 of precisely the configuration described herein. It will be evident that even when used with other types of ovate main reflectors or even circular or conoidal main reflectors, the auxiliary reflectors 5 and 6 will still serve their dual purpose of restricting the direct light from the source to a substantially rectangular pattern on the roadway and redirecting the intercepted light into that rectangular pattern.

Throughout the foregoing specification as well as in the following claims, I have referred to my reflector as an "open" reflector. By the use of such terminology, I do not intend to exclude from the scope of my invention reflectors of the type described when used with enclosing glassware. Such enclosure, either of the open end of the reflector only or of the entire unit, is obviously within the scope of the invention. By the term "open reflector" in the specification and claims, I mean merely that the reflector is shaped to function without the aid of refracting glassware, as distinguished from simple enclosing glassware. If, of course, further redistribution of light from my reflector is desired, such redistribution may be accomplished by the use of prismatic refracting glassware within the scope of my invention.

While I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A roadway luminaire comprising an ovate reflector including similar side portions on opposite sides of a major plane and end portions, said reflector having a rim lying in a plane perpendicular to said major plane, and means for mounting a light source with its effective center within said reflector and lying in said major plane, the cross-sectional configuration of each said side portion in planes perpendicular to the plane of said rim and including the projection on the plane of said rim of reflected light from each point of said side portion being a composite curve comprising a parabolic portion and an elliptic portion, all light reflected from each said parabolic portion passing directly out of said reflector along a parabolic axis directed across said reflector and inclined to the plane of the rim, and all light reflected from each said elliptic portion passing directly out of said reflector through a conjugate focus lying on an elliptic axis which passes through said light source and intercepts the parabolic axis in the same perpendicular plane.

2. A roadway luminaire comprising an ovate reflector formed of similar portions on opposite sides of a major plane and having a rim lying in a plane perpendicular to said major plane, and means for mounting a light source with its effective center positioned in said major plane above the plane of said rim, the cross-sectional configuration of each said portion in substantially all planes perpendicular to the plane of said rim and including the projection on the plane of said rim of light reflected from each point of said portion being a composite curve comprising a parabolic portion and an elliptic portion, all light reflected from each said parabolic portion passing directly out of said reflector along a parabolic axis directed across said reflector and inclined to the plane of the rim, and all light reflected from each said elliptic portion passing directly out of said reflector through a conjugate focus lying on an elliptic axis which passes through said light source and intercepts the parabolic axis in the same perpendicular plane.

3. A roadway luminaire comprising an open ovate reflector including like side portions on opposite sides of a plane of symmetry and end portions, said reflector having a rim lying in a plane perpendicular to said plane of symmetry, and means for mounting a light source with its effective center positioned in said plane of symmetry above the plane of said rim, the cross-sectional configuration of each said side portion of said reflector in planes perpendicular to the plane of said rim and including the projection on the plane of said rim of reflected light from each point of said side portion being a composite curve comprising a parabolic section in a lower zone adjacent said rim and an elliptical section above said lower zone, said parabolic and elliptical sections having a common focus and intersecting axes, all light reflected from each said parabolic section passing directly out of said reflector along a parabolic axis directed across said reflector and inclined to the plane of the rim, and all light reflected from each said elliptical section passing directly out of said reflector through a conjugate focus lying on an elliptical axis which passes through said light source and intercepts the parabolic axis in the same perpendicular plane.

4. A luminaire comprising an ovate reflector including similar side portions on opposite sides of a major plane and end portions, said reflector having a rim lying in a plane perpendicular to said major plane, means for mounting a light source with its effective center eccentrically positioned in said major plane above the plane of said rim, each said side portion having a vertical configuration at each point along its length which comprises a lower parabolic and an upper elliptical section having a common focus at the light source and lying in a plane perpendicular to the plane of the reflector rim and including the projection on the plane of the rim of reflected light from said point, the axes of each related parabolic and elliptical section lying in said plane and being inclined to each other and to the plane of said reflector rim, whereby all light reflected from said sections passes directly out of said reflector without secondary reflection.

5. A luminaire comprising an open ovate reflector having like portions on opposite sides of a plane of symmetry and having a rim lying in a plane perpendicular to said plane of symmetry, and means for mounting a light source with its effective center eccentrically positioned in said plane of symmetry above the plane of said rim, the cross sectional configuration of each said portion in substantially all planes perpendicular to the plane of said rim and including light rays reflected directly from said portion being parabolic in a lower zone adjacent said rim, the axes of said parabolas being inclined to the plane of said rim and increasing in inclination as they approach parallelism with said plane of symmetry.

6. A roadway luminaire comprising means for mounting a source of light, a main bowl-shaped reflector disposed over said source and having a generally ovate configuration in planes substantially parallel to the roadway, said reflector having side and end portions disposed to direct light from said source by single reflection across said reflector and below the opposite rim, said side portions reflecting such light principally into a pair of oppositely directed beams obliquely along said roadway, and an auxiliary reflector depending below said main reflector at one end and having in planes substantially parallel to said roadway a continuously arcuate generally U shape, said auxiliary reflector being disposed to intercept only light rays directly from said source and to redirect intercepted light along the paths of said oblique beams.

7. A roadway luminaire arranged to be positioned at one side of a roadway and comprising, means for mounting a source of light, an ovate main reflector having an axis transverse to the direction of said roadway, said main reflector by its ovate configuration concentrating reflected light from said source mainly in asymmetric beams directed generally obliquely along said roadway in opposite directions, and a pair of continuously arcuate auxiliary reflectors positioned below said main reflector at opposite ends of said major axis, said auxiliary reflectors being tapered upwardly toward the sides of said main reflector thereby to intercept only light rays directly from said source, said auxiliary reflectors by their arcuate configuration redirecting intercepted light rays along the path of said obliquely directed beams.

8. A luminaire arranged to be positioned at one side of a roadway and comprising an open ovate main reflector having side and end portions and a plane of symmetry perpendicular to the direction of said roadway, and means for mounting a light source of substantially point configuration with its center eccentrically positioned in said reflector and lying in said plane of symmetry above the plane of the reflector rim, said side portions being shaped to concentrate reflected light from said source in beams directed generally obliquely along said roadway in opposite directions and at a small angle to the plane of said roadway, and a continuously arcuate auxiliary reflector depending below said rim in the region of one of said end portions and positioned to intercept only light rays directly from said source, said auxiliary reflector redirecting intercepted light rays along the path of said obliquely directed beams.

9. A roadway luminaire comprising an open ovate main reflector having a rim lying in a plane perpendicular to its plane of symmetry, means for mounting a light source with its effective center positioned within said main reflector above the plane of said rim, and a pair of continuously arcuate auxiliary reflectors depending below said rim at opposite ends of said main reflector, the lower edges of said auxiliary reflectors being tapered upwardly toward said rim to form with said rim a substantially rectangular cut off pattern on said roadway.

10. A luminaire arranged to be mounted at one side of a roadway and comprising an open ovate main reflector having a planar peripheral edge and a major axis perpendicular to said roadway, means for mounting a light source with its effective center eccentrically positioned within said reflector, said reflector by its ovate configuration concentrating light mainly asymmetrically in beams directed obliquely along said roadway in opposite directions, and a pair of continuously arcuate auxiliary reflectors depending from said edge at opposite ends of said major axis, said auxiliary reflectors having lower edges tapered upwardly toward the edge of said main reflector to confine the cut-off pattern on said roadway to a substantially rectangular form, the arcuate side portions of said auxiliary reflectors being positioned to intercept only light directly from said source and redirecting said light mainly along said asymmetric beams.

11. A roadway luminaire arranged to be positioned at one side of a roadway and comprising an ovate main reflector having a rim lying in a plane perpendicular to its plane of symmetry, means for mounting a light source of substantially point configuration with its center eccentrically positioned in said plane of symmetry above the plane of said rim, and a pair of continuously arcuate auxiliary reflectors depending below said rim at opposite ends of said main reflector, the lower edges of said auxiliary reflector being tapered upwardly toward said rim to form in conjunction with said rim a rectangular cut-off pattern on said roadway.

12. A roadway luminaire comprising a generally ovate main reflector having a planar peripheral edge and arranged to be positioned at one side of said roadway with its major axis perpendicular to said roadway, means for mounting a light source with its effective center eccentrically positioned within said main reflector above the plane of said peripheral edge, said main reflector comprising side portions arranged by single reflection to concentrate light mainly asymmetrically in beams directed obliquely along said roadway, and a pair of continuously arcuate auxiliary reflectors depending from said peripheral edge at opposite ends of said major axis and having lower edges tapered upwardly toward said side portions to confine the cut-off pattern of said roadway to a substantially rectangular form, said auxiliary reflectors having side portions positioned to intercept only light received directly from said source and to reflect said light generally along said asymmetric beams.

13. A roadway luminaire comprising an open ovate reflector having like side portions on opposite sides of a plane of symmetry and arranged for disposition at one side of a roadway with its major axis perpendicular to the roadway, and means for mounting a light source with its effective center eccentrically positioned on said major axis, the cross-sectional configuration of each side portion in a plane substantially parallel to said roadway comprising a plurality of adjacent sections of different parabolas having different lengths, said parabolic sections having their foci at said light source and having slightly converging axes directed generally obliquely along the roadway thereby to concentrate light from said source mainly asymmetrically along the roadway in opposite directions, the lengths of said parabolic sections increasing in passing from the roadway end of said reflector toward the roadside end, whereby an appreciably greater amount of light is directed to the remote side of said roadway than is directed to the adjacent side.

14. A roadway luminaire comprising, an open ovate reflector arranged for disposition at one side of a roadway with its major axis perpendicular to the roadway, said reflector having like side portions on opposite sides of said major axis and end portions at opposite ends of said major axis, and means for mounting a light source with its effective center eccentrically positioned on said major axis, the cross-sectional configuration of each said side portion in a plane substantially parallel to said roadway being a composite curve comprising a plurality of adjacent parabolic sections having their foci at said light source and axes directed obliquely along said roadway in the same general direction, and the cross-sectional configuration of said end portions in said plane being a composite curve comprising a plurality of elliptical sections, each having one focus at said light source and arranged to direct light reflected from said source in a distributed pattern generally obliquely across said roadway.

15. A roadway luminaire comprising, an open ovate reflector arranged for disposition at one side of a roadway with its major axis perpendicular to the roadway, said reflector having like side portions on opposite sides of said major axis and end portions at opposite ends of said major axis, and means for mounting a light source with its effective center eccentrically positioned on said major axis, the cross-sectional configuration of each said side portion in a plane substantially parallel to said roadway being a composite curve comprising a plurality of adjacent parabolic sections having their foci at said light source and axes directed obliquely along said roadway in the same general direction, and the cross-sectional configuration of said end portions in said plane including a plurality of elliptical sections each having one focus at said light source and the other focus on said major axis at a point between said source and said section.

16. A roadway luminaire comprising, an open ovate reflector arranged for disposition at one side of a roadway with its major axis perpendicular to the roadway, said reflector having like side portions on opposite sides of said major axis and end portions at opposite ends of said major axis, and means for mounting a light source with its effective center eccentrically positioned on said major axis, the cross-sectional configuration of each said side portion in a plane substantially parallel to said roadway being a composite curve comprising a plurality of adjacent parabolic sections having their foci at said light source and axes directed obliquely along said roadway in the same general direction, and the cross-sectional configuration of said end portions in said plane including a plurality of elliptical sections each having one focus at said light source and the other focus on said major axis at a point between said source and said section, one said end portion including elliptical sections immediately adjacent said side portions having one focus at said light source and the other focus on the opposite side of said major axis.

17. A roadway luminaire comprising, means for mounting a source of light, a main bowl shaped reflector having an open mouth defined by a rim and positioned above said light source to reflect light downwardly upon said roadway, and auxiliary reflecting means depending below said light source and having a lower edge tapered upwardly towards the reflector rim to confine the light cut-off pattern on said roadway to a substantially rectangular form, said auxiliary reflecting means being of ovate cross section in planes substantially parallel to said roadway thereby to concentrate light reflected therefrom mainly in asymmetric beams directed generally obliquely along said roadway in opposite directions.

18. A roadway luminaire comprising, means for mounting a source of light, an ovate reflector having its major axis transverse to said roadway thereby to concentrate light from said source mainly in asymmetric beams directed obliquely along said roadway in opposite directions, the upper region of said reflector on opposite sides of said major axis being indented along two parallel lines and substantially longitudinally of said major axis to provide a pair of adjacent reflector surfaces each inwardly offset from a continuous projection of the lower region of the reflector on the same side of the major axis, said offset surfaces reflecting light from said source generally along said main assymetric beams and at high angles to the nadir.

CHARLES H. REX.

REFERENCES CITED

The following references are of record in the file of this patent:

UNITED STATES PATENTS

| Number | Name | Date |
|---|---|---|
| D. 149,972 | Rex | June 15, 1948 |
| 2,110,018 | Halvorson | Mar. 1, 1938 |
| 2,140,646 | Mitchell | Dec. 20, 1938 |
| 2,229,034 | Bergmans et al. | Jan. 21, 1941 |
| 2,422,378 | Welch | June 17, 1947 |

FOREIGN PATENTS

| Number | Country | Date |
|---|---|---|
| 723,668 | France | Jan. 18, 1932 |
| 766,879 | France | Apr. 23, 1934 |
| 846,042 | France | May 27, 1939 |
| 523,534 | England | July 17, 1940 |